(12) United States Patent
Marsolek et al.

(10) Patent No.: US 10,949,786 B2
(45) Date of Patent: *Mar. 16, 2021

(54) COLD PLANER MATERIAL TRANSPORT MANAGEMENT SYSTEM

(71) Applicant: Caterpillar Paving Products Inc., Brooklyn Park, MN (US)

(72) Inventors: John Lee Marsolek, Watertown, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,966

(22) Filed: Jul. 9, 2019

(65) Prior Publication Data

US 2019/0332987 A1 Oct. 31, 2019

Related U.S. Application Data

(63) Continuation of application No. 14/827,443, filed on Aug. 17, 2015, now Pat. No. 10,380,529.

(51) Int. Cl.
*G05D 1/00* (2006.01)
*G06Q 10/06* (2012.01)
(Continued)

(52) U.S. Cl.
CPC ... *G06Q 10/0637* (2013.01); *G06Q 10/06311* (2013.01); *E01C 23/088* (2013.01); *G05D 1/0027* (2013.01); *G08G 1/123* (2013.01)

(58) Field of Classification Search
USPC .......................................... 701/50; 705/7.13
See application file for complete search history.

(56) References Cited

U.S. PATENT DOCUMENTS 5,971,585 A * 10/1999 Dangat .................. G06Q 10/06
700/102
6,769,836 B2 8/2004 Lloyd
(Continued)

FOREIGN PATENT DOCUMENTS

DE 102013004995 9/2014
EP 2045587 4/2009
(Continued)

OTHER PUBLICATIONS

"U.S. Appl. No. 14/827,443, Notice of Allowance dated Apr. 10, 2019", 7 pgs.
(Continued)

*Primary Examiner* — Jonathan L Sample
(74) *Attorney, Agent, or Firm* — Schwegman, Lundberg & Woessner

(57) ABSTRACT

A management system for a cold planer is disclosed. The management system may include one or more sensors located onboard the cold planer and configured to generate data regarding at least one of cold planer operating parameters and milled material transferred from the cold planer to a plurality of haul vehicles. The management system may also include a locating device configured to generate a signal indicative of a cold planer location, a communication device configured to transfer information from the cold planer to a plant, and a controller in electronic communication with the one or more, the locating device, and the communication device. The controller may be configured to determine a rate of material transfer from the cold planer to the plurality of haul vehicles based on the data, and transmit the rate of material transfer and the cold planer location to the plant via the communication device.

16 Claims, 3 Drawing Sheets

(51) Int. Cl.
*E01C 23/088* (2006.01)
*G08G 1/123* (2006.01)

(56) References Cited

U.S. PATENT DOCUMENTS

| | | | | |
|---|---|---|---|---|
| 6,862,521 B1* | 3/2005 | Fox | ............... | G01C 21/00 340/994 |
| 8,099,218 B2* | 1/2012 | Glee | ............... | E01C 19/288 701/50 |
| 8,744,646 B2* | 6/2014 | Buschmann | ............... | G01C 21/00 701/2 |
| 8,909,389 B2* | 12/2014 | Meyer | ............... | A01D 75/185 701/2 |
| 8,930,092 B2* | 1/2015 | Minich | ............... | E01C 19/48 701/50 |
| 8,940,360 B1* | 1/2015 | Brasier | ............... | E01C 23/06 427/138 |
| 8,942,897 B2* | 1/2015 | Foster | ............... | G06F 19/00 701/50 |
| 9,481,964 B1* | 11/2016 | Marsolek | ............... | G01S 19/14 |
| 10,308,440 B2* | 6/2019 | Marsolek | ............... | E01C 23/088 |
| 10,380,529 B2* | 8/2019 | Marsolek | ............... | G06Q 10/06311 |
| 2002/0035495 A1* | 3/2002 | Spira | ............... | G06Q 30/0205 705/7.36 |
| 2002/0082893 A1 | 6/2002 | Barts | ............... | G06Q 10/0833 705/334 |
| 2004/0071043 A1* | 4/2004 | Aizawa | ............... | B28C 9/00 366/1 |
| 2004/0260504 A1* | 12/2004 | Bienvenu | ............... | G06F 3/048 702/127 |
| 2005/0278303 A1* | 12/2005 | Ruml | ............... | G06Q 10/06 |
| 2007/0094055 A1* | 4/2007 | Nakayama | ............... | E02F 9/2054 705/5 |
| 2007/0271002 A1* | 11/2007 | Hoskinson | ............... | G05D 1/0088 700/245 |
| 2008/0216021 A1* | 9/2008 | Berning | ............... | E01C 19/00 715/846 |
| 2009/0142133 A1* | 6/2009 | Glee | ............... | E01C 19/48 404/75 |
| 2009/0144261 A1* | 6/2009 | Ruml | ............... | G06Q 10/06 |
| 2009/0198422 A1* | 8/2009 | Vik | ............... | G07C 5/008 701/50 |
| 2011/0066337 A1* | 3/2011 | Kormann | ............... | A01D 43/073 701/50 |
| 2012/0027514 A1* | 2/2012 | Hall | ............... | E01C 23/065 404/91 |
| 2012/0253612 A1* | 10/2012 | Byrne | ............... | E01C 19/4853 701/50 |
| 2012/0271489 A1* | 10/2012 | Roberts | ............... | H04L 67/12 701/2 |
| 2012/0288328 A1* | 11/2012 | Minich | ............... | E01C 19/004 404/72 |
| 2013/0076101 A1* | 3/2013 | Simon | ............... | G05D 1/0293 299/39.2 |
| 2013/0080000 A1* | 3/2013 | Von der Lippe | ............... | E01C 23/088 701/50 |
| 2013/0241163 A1* | 9/2013 | Bullis | ............... | A01D 46/243 280/32.7 |
| 2014/0097665 A1* | 4/2014 | Paulsen | ............... | G01S 17/88 299/39.4 |
| 2015/0117951 A1* | 4/2015 | Schlenker | ............... | E01C 23/088 404/84.05 |
| 2015/0218762 A1* | 8/2015 | Berning | ............... | E01C 23/127 299/1.9 |
| 2016/0060828 A1* | 3/2016 | Killion | ............... | E01C 23/088 299/1.5 |
| 2016/0073580 A1* | 3/2016 | Scrivner | ............... | A01D 34/668 701/50 |
| 2016/0076205 A1* | 3/2016 | Corcoran | ............... | E02D 3/026 73/784 |
| 2016/0341595 A1* | 11/2016 | Marsolek | ............... | G01G 13/08 |
| 2016/0348324 A1* | 12/2016 | Engelmann | ............... | E01C 23/127 |
| 2017/0009408 A1* | 1/2017 | Marsolek | ............... | G05B 19/042 |
| 2017/0053220 A1 | 2/2017 | Marsolek et al. | | |
| 2017/0130405 A1* | 5/2017 | Engelmann | ............... | E02F 9/261 |
| 2019/0119047 A1* | 4/2019 | Marsolek | ............... | F16H 55/36 |
| 2019/0155315 A1* | 5/2019 | DeLong | ............... | E01C 23/088 |

FOREIGN PATENT DOCUMENTS

| | | |
|---|---|---|
| JP | 2008071008 | 3/2008 |
| WO | 2014053702 | 4/2014 |
| WO | 2017030778 | 2/2017 |

OTHER PUBLICATIONS

"International Application Serial No. PCT/US2016/045108, International Search Report dated Oct. 31, 2016", 3 pgs.

"International Application Serial No. PCT/US2016/045108, Written Opinion dated Oct. 31, 2016", 7 pgs.

"U.S. Appl. No. 14/827,443, Non Final Office Action dated Feb. 8, 2019", 10 pgs.

"U.S. Appl. No. 14/827,443, Response filed Mar. 21, 2019 to Non Final Office Action dated Feb. 8, 2019", 8 pgs.

* cited by examiner

COLD PLANER MATERIAL TRANSPORT MANAGEMENT SYSTEM

CLAIM OF PRIORITY

This application is a continuation of U.S. patent application Ser. No. 14/827,443, filed on Aug. 17, 2015, now granted as U.S. Pat. No. 10,380,529 which is incorporated herein by reference in its entirety.

TECHNICAL FIELD

The present disclosure relates generally to a management system and, more particularly, to a material transport management system for a cold planer.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum, and conveyors. The milling drum, fitted with cutting tools, is rotated through a suitable interface with the engine to break up the surface of the roadway. The broken up roadway material is deposited by the milling drum onto the conveyors, which transfer the broken up material into haul trucks for removal from the worksite. As haul trucks are filled, they are replaced with empty haul trucks. The filled trucks transport the broken up material to a different location to be reused as aggregate in new asphalt or otherwise recycled. This transport process repeats until the milling process is finished.

Operators may wish to coordinate the timely arrival of empty haul trucks at the milling site with the pace of the milling process in order to improve the overall efficiency of the operation. On one hand, having too few empty trucks at the milling site can lead to increased down time when an operator must stop the cold planer to wait for an empty truck to arrive. On the other hand, too many empty trucks at the milling site can result in the wasteful under-utilization of resources. Cold planer operators typically communicate with a truck dispatcher at a material processing plant in an attempt to coordinate the movement of trucks to and from the jobsite. However, calls to the dispatcher from jobsite personnel may not always provide the dispatcher with enough information or enough time to efficiently coordinate movement of the trucks to and from the jobsite.

One attempt to monitor the production of a milling machine is disclosed in U.S. Patent Application Publication No. 2008/0216021 A1 of Bering et al. that published on Sep. 4, 2008 ("the '021 publication"). In particular, the '021 publication discloses a system for monitoring the operating parameters of the milling machine, the loading of a haul truck, and the surfaces in front of and behind a milling rotor of the milling machine. The system includes a number of sensors configured to measure operating parameters, including ambient conditions, engine parameters, and the position of a number of actuators that are configured operate tools and implements of the milling machine. The system also includes a number of cameras configured to observe the loading of milled material into a haul truck via a conveyor system, an unmilled surface in front of the milling rotor, and a milled surface behind the milling rotor. A processing unit transmits data from the sensors to a memory for data storage, as well as to a display in an operator station of the milling machine. A number of switches associated with the display allow the operator to select which parameters and camera feeds to observe on the display while operating the milling machine. The processing unit can establish a remote data transmission connection in order to communicate data from the sensors and cameras with a control center or another machine.

While the system of the '021 publication may allow for the observation of some milling parameters, it may not be optimum. In particular, information transmitted by the system of the '021 publication may be limited to data generated by the sensors and cameras. Further, the cameras may only allow for the observance of qualitative information, which may not be quickly and/or easily analyzed by onboard entities for other purposes.

The management system of the present disclosure solves one or more of the problems set forth above and/or other problems in the art.

SUMMARY

In one aspect, the present disclosure is related to a management system for a cold planer and a plurality of haul vehicles configured to transport milled material from the cold planer to a plant. The management system may include one or more sensors located onboard the cold planer and configured to generate data regarding at least one of cold planer operating parameters and milled material transferred from the cold planer to the plurality of haul vehicles. The management system may further include a locating device configured to generate a signal indicative of a cold planer location, a communication device configured to transfer information from the cold planer to the plant, and a controller in electronic communication with the one or more and the locating device. The controller may be configured to determine a rate of material transfer from the cold planer to the plurality of haul vehicles based on the data, and transmit the rate of material transfer cold planer location to the plant via the communication device.

In another aspect, the present disclosure is related to a method of managing material transport from a cold planer to a plant. The method may include milling a work surface, transferring milled material from the work surface into a transport vehicle, generating data regarding at least one of cold planer operating parameters and the milled material transferred from the cold planer to the haul vehicle, and determining a rate of material transfer from the cold planer to the haul vehicle based on the data. The method may further include determining a location of the cold planer, and transmitting the rate of material transfer and the location of the cold planer to a plant.

In yet another aspect, the present disclosure is directed to a cold planer. The cold planer may include a frame, a milling drum connected to the frame, a conveyor pivotally connected to the frame and configured to load milled material into a transport vehicle, and one or more sensors located onboard the cold planer and configured to generate data regarding at least one of cold planer operating parameters and milled material transferred from the cold planer to the plurality of haul vehicles. The cold planer may further include a locating device configured to generate a signal indicative of a cold planer location, a communication device configured to transfer information from the cold planer to a plant, and a controller in electronic communication with the one or more sensors and the locating device. The controller may be configured to determine a rate of material transfer from the cold planer to the plurality of haul vehicles based on the data, determine a material ID associated with the material transfer rate based on the cold planer location, and transmit one or more of the rate of material transfer, the material ID, and the cold planer location to the plant via the communication device.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. It is contemplated that the disclosed cold planer may also or alternatively be used to remove cement and other roadway surfaces, or to remove non-roadway surface material such as in a mining operation.

Figure 1:
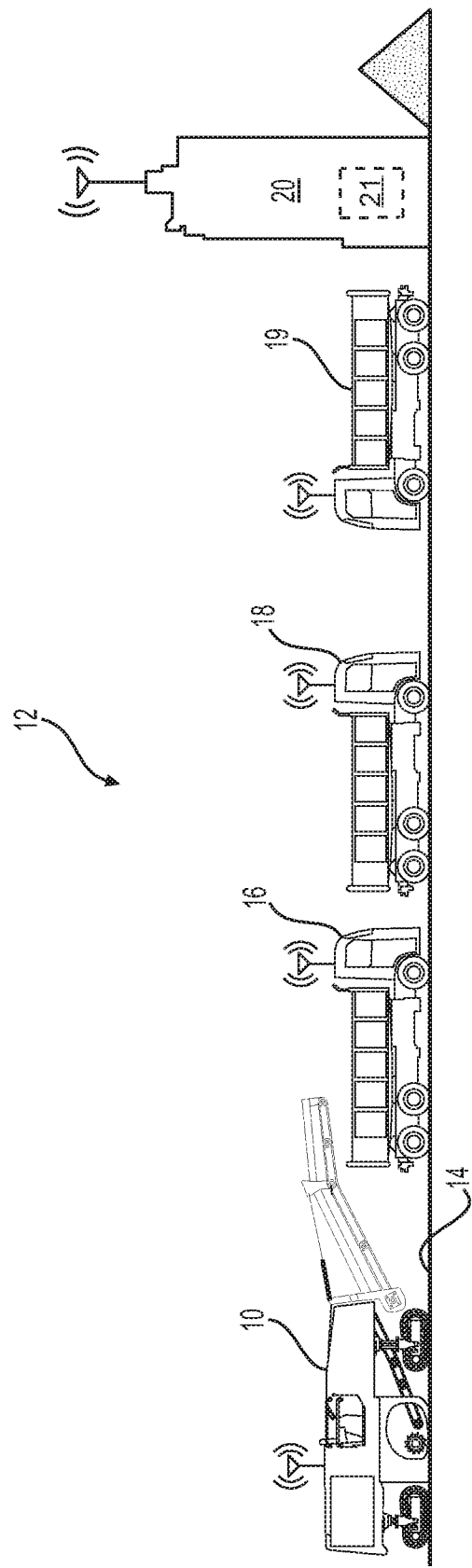
FIG. 1 is a pictorial illustration of an exemplary disclosed worksite and plant.

FIG. 1 shows a cold planer 10 employed at a worksite 12, such as, for example, a roadway milling operation. As part of the milling operation, cold planer 10 may mill a surface 14 of the roadway and transfer milled material into a first of a plurality of haul vehicles ("haul vehicle") 16. In some situations, a second haul vehicle 18 may be in a standby position near cold planer 10, and a third haul vehicle 19 may be located at or near plant 20, such as at an associated dispatch facility 21. It is understood that any number of haul vehicles may be positioned near cold planer 10 (e.g., in the standby position) and/or at plant 20 (e.g., awaiting dispatch). It is also understood that the dispatch facility may be located at plant 20 or at a different location. Plant 20 may be any location where milled material is delivered for storage, processing, recycling, disposal, etc. When full, haul vehicle 16 may depart from cold planer 10 to deliver the milled material to plant 20, and haul vehicle 18 may approach cold planer 10 to replace haul vehicle 16 so the milling operation may continue. Haul vehicle 19 may be dispatched to cold planer 10 to replace transport vehicle 18 in the standby position.

Haul vehicles 16-19 may be mobile machines (e.g., dump trucks, articulated dump trucks, tractor-trailers, etc.) configured to transport material from a first location to a second location. Haul vehicles 16-19 may also be configured to communicate with plant 20 and/or cold planer 10 during milling operations. For example, haul vehicles 16-19 may include a communication device 22 configured to exchange information with plant 20 and/or cold planer 10, a locating device 24 configured to generate a signal indicative of a haul vehicle location, and a controller 26 in electronic communication with devices 22-24 (22-26 shown only in FIG. 3). It is understood that haul vehicles 16-19 may also include input devices (buttons, keyboards, switches, knobs, levers, pedals, etc.) and output devices (e.g., displays, lights, speakers, etc.) for operating haul vehicles 16-19 and communicating with plant 20 and/or cold planer 10, as desired.

Plant 20 may include one or more facilities configured to receive milled material from haul vehicles 16-19. For example, plant 20 may include one or more material storage sites at each facility for storing different types of milled material (e.g., milled asphalt, milled concrete, etc.) delivered by haul vehicles 16-19. In some situations, plant 20 may also include one or more paving material production sites where milled material may be reincorporated into fresh paving material mixtures (e.g., asphalt, concrete, etc.).

Figure 3:
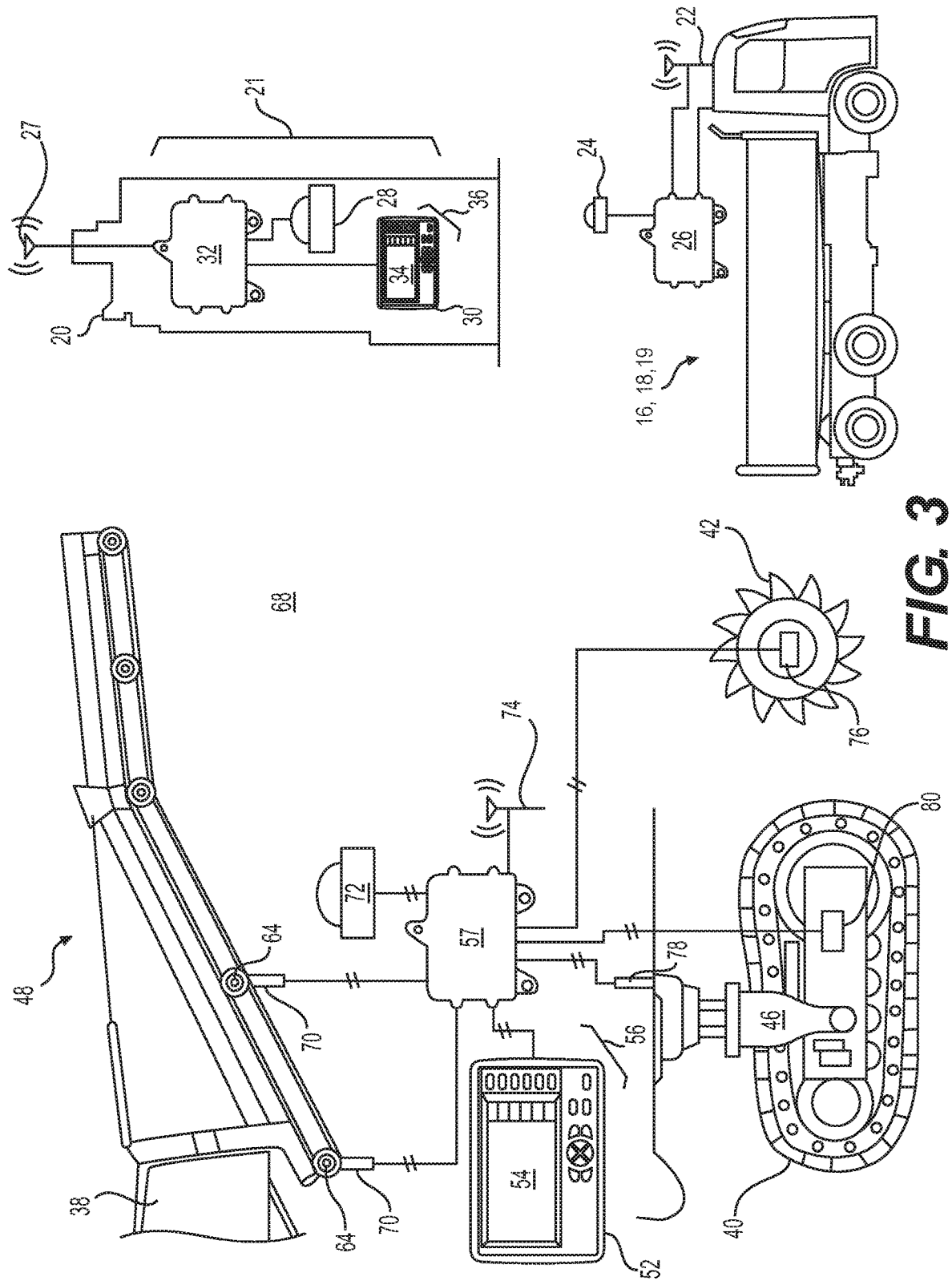
FIG. 3 is a diagrammatic illustration of an exemplary disclosed material transport management system that may be used with the cold planer of FIG. 2 and plant of FIG. 1.

The dispatch facility 21 associated with plant 20 may house equipment for organizing the movement of haul vehicles 16-19 between cold planer 10 and plant 20. For example, plant 20 may include a storage facility for a number of haul vehicles and include communication equipment for receiving information from cold planer 10 and sending dispatch signals to haul vehicles 16-19. Referring to FIG. 3, dispatch facility 21 may include a communication device 27 configured to exchange information with cold planer 10 and haul vehicles 16-19, a locating device 28 configured to generate a signal indicative of a plant and/or dispatch facility location, an interface device 30 for controlling plant 20 and/or dispatch operations, and a controller 32 in electronic communication with devices 27-30 (27-32 shown only in FIG. 3). Interface device 30 may include, among other things, a display 34 and an input device 36 (34-36 shown only in FIG. 3). In other embodiments, interface device 30 may embody a remote control, such as a handheld controller, that may be used from anywhere on or off worksite 12. Interface device 30 may alternatively embody a software program and user interface for a computer, and may include a combination of hardware and software.

Figure 2:
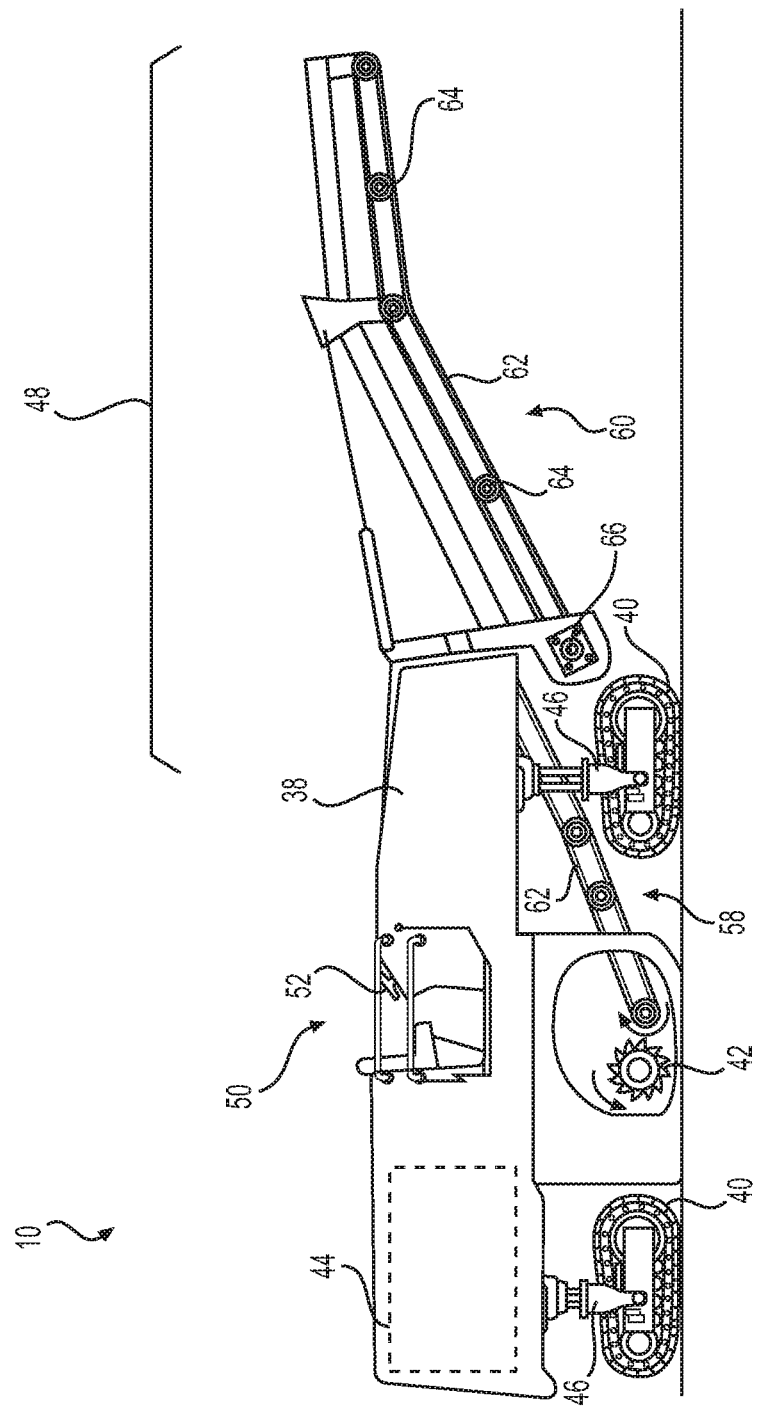
FIG. 2 is a cutaway view illustration of an exemplary disclosed cold planer that may be used on the worksite of FIG. 1.

FIG. 2 illustrates an exemplary cold planer 10 having a frame 38 supported by one or more traction devices 40, a milling drum 42 rotationally supported under a belly of frame 38, and an engine 44 mounted to frame 38 and configured to drive milling drum 42 and traction devices 40. Traction devices 40 may include either wheels or tracks connected to actuators 46 that are adapted to controllably raise and lower frame 38 relative to a ground surface. It should be noted that, in the disclosed embodiment, raising and lowering of frame 38 may also function to vary a milling depth of milling drum 42 into surface 14. In some embodiments, the same or different actuators 46 may also he used to steer cold planer 10 and or to adjust a travel speed of traction devices 40 (e.g., to speed up or brake traction devices 40), if desired. A conveyor system 48 may be pivotally connected at a leading end to frame 38 and configured to transport material away from milling drum 42 and into a receptacle, such as haul vehicle 16 (referring to FIG. 1).

Frame 38 may also support an operator station 50. Operator station 50 may house any number of interface devices 52 used to control cold planer 10. In the disclosed example, interface devices 52 may include, among other things, a display 54 and an input device 56 (54-56 shown only in FIG. 3). In other embodiments, operator station 50 may be offboard cold planer 10. For example, operator station 50 may embody a remote control, such as a handheld controller, that an operator may use to control cold planer 10 from anywhere on worksite 12. Operator station 50 may alternatively embody a software program and user interface for a computer, and may include a combination of hardware and software. In other embodiments, cold planer 10 may be autonomous and may not include operator station 50.

Display 54 may be configured to render the location of cold planer 10 (e.g., of milling drum 42) relative to features of the jobsite (e.g., milled and/or unmilled parts of surface 14), and to display data and/or other information to the operator. Input device 56 may be configured to receive data and/or control instructions from the operator of cold planer 10. Other interface devices (e.g., control devices) may also be possible, and one or more of the interface devices described above could be combined into a single interface device, if desired.

Input device 56 may be, for example, an analog input device that receives control instructions via one or more buttons, switches, dials, levers, etc. Input device 56 may also or alternatively include digital components, such as one or more soil keys, touch screens, and/or visual displays. Input device 56 may be configured to generate one or more signals indicative of various parameters associated with cold planer 10 and/or its surrounding environment based on input received from the operator. For example, input device 56 may be configured to receive inputs indicative of milled material density p, a material ID (i.e., a type of material being milled), and parameters of haul vehicle 16 (e.g., dimensions, volume capacity, weight capacity, legal weight limit etc.). Input device 56 may also be configured to allow the operator to indicate when a receptacle is empty or full, for example, by pressing a button associated with input device 56. The information received via input device 56 may be sent to and/or stored in a controller 57 (referring to FIG. 3) and used for further processing.

Conveyor system 48 may include a first conveyor 58 adjacent milling drum 42 that is configured to transfer milled material to a second conveyor 60. Conveyors 58 and 60 may each include a belt 62 that is supported on a plurality of roller assemblies 64 and driven by a motor 66. Motor 66 may embody, for example, a hydraulic motor 66 powered by a hydraulic system (not shown). In other embodiments, motor 66 may be an electric motor or another type of motor. Motor 66 may be powered by engine 44 or by another power source.

As illustrated in FIG. 3, a material transport management system 68 ("management system") may be associated with cold planer 10 and include elements that cooperate to monitor and analyze material transfer into haul vehicle 16 and facilitate communication between cold planer 10 and plant 20. Management system 68 may facilitate the communication of data from cold planer 10 to plant 20 regarding operating parameters of cold planer 10 and/or milled material transferred into haul vehicles 16-19. Based on the data, dispatch signals may be generated and communicated to haul vehicles 16-19 from plant 20 in order to facilitate the timely arrival of haul vehicles 16-19 to worksite 12, as well as to provide instructions for transporting milled material away from worksite 12.

Elements of management system 68 may cooperate to generate data regarding cold planer 10 and the transference of material into haul vehicles 16-19 and communicate the data to plant 20. For example, management system 68 may determine a location of cold planer 10, a rate of material transfer $\Delta$ (e.g., a mass flow rate $\dot{m}$ and/or a volume flow rate $\dot{V}$, weight per unit of time, a number of haul vehicles per unit time, etc.), a total weight $W_m$ ("weight") of milled material that has been transferred, a fill level $\Sigma$ of haul vehicle 16, an amount of remaining time $T_F$ until haul vehicle 16 is full, and/or other statistical information that may be used by plant 20 to determine when to dispatch haul vehicles 16-19. Elements of management system 68 may include interface devices 52, one or more sensors 70, a locating device 72, a communication device 74, and controller 57 electronically connected with each of the other elements. Information, including the rate of material transfer $\Delta$, the weight $W_m$, the fill level $\Sigma$, the remaining time $T_F$, and the location of cold planer 10 may be shown to the operator of cold planer 10 via display 54 and/or transmitted to plant 20 via communication device 74 for further processing.

Sensors 70 may include one or more sensors and/or systems of sensors configured to generate a signal indicative of cold planer operating parameters and/or the rate of material transfer into haul vehicle 16 via conveyor system 48. In one embodiment, for example, sensors 70 may include a belt scale and belt speed sensor configured to generate signals that may be used to determine how much material is on conveyor system 48 and at what rate $\Delta$ the material is being transferred into haul vehicle 16. In another embodiment, sensors 70 may generate signals indicative of a power and speed of motor 66, such as a hydraulic pressure sensor and a motor speed sensor. Sensors 70 may alternatively include an electrical voltage sensor or another type of sensor configured to measure the power output of motor 66. The signals generated by sensors 70 may be utilized by controller 57 in conjunction with other sensed or known parameters (e.g., belt speed, conveyor incline, hydraulic fluid flow rate, motor speed, motor displacement, electrical resistance, electrical current, etc.) to determine the rate of material transfer $\Delta$ into haul vehicle 16.

Sensors 70 may alternatively embody other types of sensors that are configured to determine the amount of material being transferred by conveyor system 48 without contacting any moving parts of conveyor system 48. For example, sensors 70 may include a radioactive detection system, a laser scanning system, an optical scanner, a camera, and/or an ultrasonic sensor that is configured to generate a signal indicative of an amount of material (e.g., an area or volume) that has been milled and subsequently transferred via conveyor system 48. Signals from sensors 70 may be used in conjunction with additional parameters (e.g., ground speed, belt speed, milling time, etc.) to determine a volume of material transferred into haul vehicle 16.

In some embodiments, management system 68 may include one or more additional sensors in electronic communication with controller 57. For example, management system 68 may include a milling drum speed sensor 76, a milling drum depth sensor 78, and a ground speed sensor 80. Milling drum speed sensor 76 may be a magnetic pickup or other type of sensor configured to generate a signal indicative of a rotational speed of milling drum 42. Milling drum depth sensor 78 may be associated with actuators 46 and configured to generate a signal indicative a height of frame 38 above surface 14, which may be used to determine the depth of milling drum 42 below surface 14 based on known offsets between milling drum 42 and frame 38. Ground speed sensor 80 may be a magnetic pickup or other type of sensor associated with traction devices 40 or another drive component of cold planer 10 (e.g., engine 44, a transmission, etc.). Ground speed sensor 80 may be configured to generate a signal indicative of a ground speed of cold planer 10. Signals generated by sensors 76-80 may be utilized by controller 57 in conjunction with signals generated by sensors 70 to determine the rate of material transfer $\Delta$ into haul vehicle 16.

Locating device 72 may be configured to generate a signal indicative of a geographical position of the cold planer 10 relative to a local reference point, a coordinate system associated with the work area, a coordinate system associated with Earth, or any other type of 2-D or 3-D coordinate system. For example, locating device 72 may embody an electronic transponder configured to communicate with one or more satellites, or a local radio or laser transmitting system used to determine a relative geographical location of itself. Locating device 72 may receive and analyze high-frequency, low-power radio or laser signals from multiple locations to triangulate a relative 3-D geographical position. The signal indicative of this geographical position may be communicated from locating device 72 to controller 57 for further processing.

Communication device 74 may include hardware and/or software that enables sending and receiving of data messages between controller 57 and plant 20. The data messages may be sent and received via a direct data link and/or a wireless communication link, as desired. The direct data link may include an Ethernet connection, a connected area network (CAN), or another data link known in the art. The wireless communications may include one or more of satellite, cellular, Bluetooth, WiFi, infrared, and any other type of wireless communications that enables communication device 74 to exchange information.

Controller 57 may embody a single microprocessor or multiple microprocessors that include a means for monitoring operator and sensor input, and responsively adjusting operational characteristics of cold planer 10 based on the input. For example, controller 57 may include a memory, a secondary storage device, a clock, and a processor, such as a central processing unit or any other means for accomplishing a task consistent with the present disclosure. Numerous commercially available microprocessors can be configured to perform the functions of controller 57. It should be appreciated that controller 57 could readily embody a general machine controller capable of controlling numerous other machine functions. Various other known circuits may be associated with controller 57, including signal-conditioning circuitry, communication circuitry, and other appropriate circuitry. Controller 57 may be further communicatively coupled with an external computer system, instead of or in addition to including a computer system, as desired.

Controller 57 may be configured to determine the rate of material transfer $\Delta$ into haul vehicle 16, an amount of material yet to be milled, and an ID of material being transferred into haul vehicle 16 based on one or more of the data generated by sensors 70 and 76-80 and the location of cold planer 10. For example, controller 57 may receive the signals from sensors 70 and determine the mass m of material on belt 62 based on the signals. Using the mass in in conjunction with other information received from sensors 70 and/or sensors 76-80 (e.g., belt speed, ground speed, etc.), controller 57 may be configured to determine the mass flow rate $\dot{m}$ of material being transferred by conveyor system 48 into haul vehicle 16. Controller 57 may continually determine the mass flow rate $\dot{m}$ and determine the total weight $W_m$ of material transferred by multiplying the mass flow rate $\dot{m}$ by an elapsed period of milling time and summing the total over a period of conveying time.

In embodiments where sensors 70 are configured to generate signals indicative of an area or volume V of milled material (i.e., instead of the mass in), controller 57 may be configured to determine the rate of material transfer $\Delta$ into haul vehicle 16 based on the area or volume V of material transferred. For example, controller 57 may be configured to determine the area or volume V of material transferred based on the signals from sensors 70, and multiply the area by a linear speed (e.g. belt speed, ground speed, etc.) or dividing the volume V by a milling time, respectively, to determine the volume flow rate $\dot{V}$. Controller 57 may determine the total weight $W_m$ of milled material by multiplying the volume flow rate $\dot{V}$ by a period of milling time and the density $\rho$ of the milled material, and summing the total over a period of conveying time. The density $\rho$ may be received by controller 57 from input device 56 or may be stored within its memory.

Controller 57 may be configured to determine the fill level $\Sigma$ of haul vehicle 16 based on the mass flow rate $\dot{m}$, the volume flow rate $\dot{V}$, and/or the total weight $W_m$ of the milled material and known features of haul vehicle 16 (e.g., geometry, volumetric capacity, shape, weight capacity, etc.) received via input device 56 or retrieved from its memory. In other embodiments, features of haul vehicle and/or other information e.g., the density $\rho$ of milled material) may be automatically received from haul vehicles 16-19 via communication device 74. Using this information, controller 57 may be configured to determine the remaining time $T_F$ until haul vehicle 16 is full (i.e., reaches a threshold fill level, a desired fill level, a maximum fill level, etc.). For example, controller 57 may compare the mass flow rate $\dot{m}$, volume flow rate $\dot{V}$, total weight $W_m$, and/or fill level $\Sigma$ to a target value over a period of conveying time, and determine how much time remains until haul vehicle 16 will become full.

Based on one or more of the rate of material transfer $\Delta$, the total weight $W_m$, and the information received from locating device 72, controller 57 may be configured to determine the amount of material yet to be milled. For example, controller 57 may track the location data of cold planer 10 during the milling operation and determine an area of worksite 12 that has been milled based on the location data and an area yet to be milled based on known geographic information of worksite 12. Using this information and information from sensors 76-80, controller 57 may determine a volume and/or a weight of material yet to be milled. Alternatively, controller 57 may determine the amount of material yet to be milled based on a difference between known milling operation plans (e.g., a known area volume, weight, etc., to be milled) and the total weight $W_m$ and/or other information.

Controller 57 may be configured to communicate one or more of the fill level $\Sigma$, the remaining time $T_F$ until haul vehicle 16 is full, the rate of material transfer $\Delta$ (e.g., volume flow rate $\dot{V}$ or mass flow rate $\dot{m}$), the total weight $W_m$, and/or other information to plant 20 via communication device 74. Controller 57 may be configured to show this information to the operator of plant 20 via display 34 associated with plant 20 and/or communicate it to controller 32 for further processing. In this way, operators of plant 20 and/or controller 32 may be able to monitor and control dispatching of haul vehicles 16-19 with accurate data received in real-time.

Management system 68 may also include locating device 28, interface device 30, and controller 32 associated with plant 20. For example, controller 32 may be configured to receive the data from controller 57 via communication device 27 for further processing. Controller 32 may show the data to the operator of plant 20 via display 34, thereby allowing the operator to generate dispatch signals for haul vehicles 16-19 based on the data received in real-time. Controller 32 may also or alternatively generate the dispatch signals automatically based on the data received from controller 57, thereby allowing the operator of plant 20 to focus on other tasks.

For example controller 32 may receive the location of cold planer 10 and the data via communication device 27 and determine a distance between plant 20 and cold planer 10 in conjunction with information received from locating device 28. The data from cold planer 10 may include the ground speed of cold planer 10, a heading of cold planer 10 (e.g., a compass direction), and/or multiple location and time data points that may be used to determine a heading of cold planer 10. Based on this information, controller 32 may be configured to determine the distance between cold planer 10 and plant 20, as well as a travel time of a haul vehicle traveling from plant 20 to cold planer 10 based on the distance and heading of cold planer 10. In other embodiments, the distance and travel time between cold planer 10 and plant 20 may be determined by controller 57 and received as an input by controller 32 via communication devices 74 and 27.

Controller 32 may also be configured to select a travel route from plant 20 to cold planer 10 based on information received from locating device 28 in conjunction with one or more of the data received from cold planer 10, the distance from plant 20 to cold planer 10, and the travel time. For example, controller 32 may select a route that ensures the travel time is within a desired limit or threshold, such as the remaining time $T_F$ until haul vehicle 16 is full. Other time thresholds may be used, if desired. Controller 32 may be configured to determine the desired travel route based also on known geographical, terrain, and road information that is stored within its memory, associated with locating device 28 (e.g., stored within a memory of locating device 28), or received via communication device 27.

Controller 32 may also be configured to track a number of haul vehicles 16-19 currently located at worksite 12 and determine a desired number of haul vehicles 16-19 to be located at worksite 12 in order to ensure a continuous workflow. For example, controller 32 may track the location of each haul vehicle 16-19 based on signals generated by locating devices 24 associated with each haul vehicle 16-19, and determine the number of vehicles currently located at worksite 12 based on the signals and the known location of worksite 12. Based on the rate of material transfer Δ received from cold planer 10, controller 32 may determine a rate at which milled material is hauled away from worksite 12, and determine a rate at which empty trucks (e.g., having known weight and/or volume capacities) should he delivered to worksite 12 in order to accommodate the rate of material transfer Δ. Based on the travel time of haul vehicles 16-19 from plant 20 to cold planer 10 and the rate of material transfer Δ, controller 32 may determine a desired number of haul vehicles 16-19 to be located at worksite 12 in the standby position at any given time. When the number of haul vehicles 16-19 currently located at worksite 12 is less than the desired number of haul vehicles 16-19, controller 32 may determine that additional haul vehicles 16-19 should he sent to worksite 12 and dispatch additional haul vehicles 16-19. In this way, operation of cold planer 10 may be continuous during a shift and may not have to be paused to wait for empty haul vehicles 16-19.

When controller 32 determines that additional haul vehicles 16-19 should be sent to worksite 12, controller 32 may generate a first dispatch signal indicative of a request for one or more empty haul vehicles 16-19 to travel to cold planer 10 at worksite 12. Controller 32 may direct the first dispatch signal to a particular one or more of haul vehicles 16-19 via communication device 27, and the dispatch signal may include one or more of the location of cold planer 10, the desired travel route, the distance to cold planer 10, and the travel time. The dispatch signal may include other data and/or instructions, if desired.

When, for example, haul vehicle 16 is full and departs cold planer 10 to return to plant 20, controller 32 may be configured to generate a second dispatch signal based on data received from cold planer 10 and/or other information. For example, controller 32 may receive the material ID associated with the milled material loaded into haul vehicle 16 from cold planer 10, and determine a location to deliver the milled material based on the material ID. When plant 20 has available space to receive material having the ID associated with the milled material in haul vehicle 16, controller 32 may direct haul vehicle 16 via the second dispatch signal to return to plant 20. In some embodiments, controller 32 may direct haul vehicle 16 to a particular location within plant 20 based on the associated material ID.

In other situations, however, controller 32 may determine that plant 20 cannot receive additional material having the associated ID and direct haul vehicle 16 to an alternate location via the second dispatch signal. For example, controller 32 may determine that plant 20 cannot receive additional material based on known stock quantities, the total weight $W_m$ of milled material having the associated ID, a number of full haul vehicles 16-19 in transit, the rate of material transfer Δ, etc. In these situations, the second dispatch signal may include details regarding the alternate location (e.g., the grid location, a travel route, a travel time, etc.). It should be noted that first and second dispatch signals may be generated manually by the operator of plant 20.

INDUSTRIAL APPLICABILITY

The disclosed management system may be used with any cold planer where achieving continuous milling operations by reducing waiting time for transport vehicles is important. The disclosed management system may determine the rate material transfer into a haul vehicle and the location of the cold planer, and communicate this information to a dispatch facility associated with a plant where dispatch signals for haul vehicles may be manually or automatically generated. A controller associated the plant may generate dispatch signals based on data received from the cold planer in order to ensure the timely arrival of a desired number of haul vehicles to support continuous milling operations of the cold planer. The controller associated with the plant may determine the distance and travel time between the plant and the cold planer and the number of desired haul vehicles, and generate dispatch signals based on this information. A controller associated with the cold planer may determine a material ID associated with the material transferred into the haul vehicle and communicate the material ID to the plant. The plant may generate dispatch signals indicative of a location for the haul vehicle to deliver the milled material based on the material ID. Operation of management system 68 will now be explained.

During operation of cold planer 10, material from surface 14 may be removed by milling drum 42 as cold planer 10 is propelled across surface 14 by traction devices 40. The milled material may be loaded into haul vehicle 16 by conveyor system 48 while empty haul vehicle 18 waits in a standby position. Haul vehicle 19 may initially be located at plant 20 or another location awaiting a dispatch signal from dispatch facility 21.

As milled material is loaded into haul vehicle 16, controller 57 of cold planer 10 may generate data regarding at least one of cold planer operating parameters and milled material transferred from cold planer 10 to haul vehicle 16.

For example, controller may receive signals from sensors 70 indicative of an amount of milled material on conveyor system 48 and/or being transferred into haul vehicle 16. Controller 57 may also or alternatively receive signals from one or more of sensors 76-80 indicative of the speed of milling drum 42, the depth of milling drum 42, and the ground speed of cold planer 10. Based on the signals from one or more of sensors 70 and 76-80, controller 57 may determine the rate of material transfer Δ (e.g., the mass flow rate m, the volume flow rate $\dot{V}$, etc.) into haul vehicle 16. Based on the material transfer rate, controller 57 may then determine additional data, such as the total weight $W_m$ of milled material, the fill level Σ of haul vehicle 16, and the remaining time $T_F$ until haul vehicle 16 is full.

Controller 57 may also generate cold planer location data during the milling operation based on signals received from locating device 72. The location data may include geographic position of cold planer 10 and/or the heading of cold planer 10, which may be used to generate further data. For example, controller 57 may determine a material ID of the milled material being transferred into haul vehicle 16 based on the location of cold planer 10. Known locations of different material types may be stored within the memory of controller 57 or received by controller 57 via locating device 72 and/or communication device 74. Controller 57 may associate the material ID with the milled material based on this information.

Controller 57 may also determine an amount of material yet to be milled based on the location data and/or information received from sensors 70 and 76-80. For example, controller 57 may track the position cold planer 10 during the milling operation based on the signals from locating device 72 and determine an area of worksite 12 that has been already milled. Based on known geographic information of worksite 12, controller 57 may then compare the milled area and the known information of worksite 12 to determine a difference between them as the area yet to be milled. Alternatively, controller 57 may continually determine and track how much material has been milled, such as the total weight $W_m$ of milled material, and compare that amount to known milling operation parameters (e.g., a targeted weight, volume, mass, etc.).

Controller 57 may then communicate the generated data to plant 20 via communication devices 74 and 27. Once the data is received via communication device 27, operators of plant 20 and/or controller 32 of plant 20 may analyze the data and generate dispatch signals (e.g., first and second dispatch signals) to haul vehicles 16-19. In one example, an operator of plant 20 may view the data in real-time via display 34 and determine when to send additional haul vehicles to worksite 12. The operator may also view the data and determine when to send dispatch signals to, for example, haul vehicle 16 as it returns to plant 20 from cold planer 10.

In another example, controller 32 may receive the data from cold planer 10 via communication device 27 and automatically generate dispatch signals to haul vehicles 16-19 based on the data. For example, controller 32 may receive the rate of material transfer Δ from cold planer 10 and determine a rate at which material is being hauled away from worksite 12 (e.g., a number of haul vehicles per unit time, an amount of material per unit time, etc.). Controller 32 may also determine a distance and travel time between plant 20 and cold planer 10 based on the location data received from cold planer 10. Based on this information, controller 32 may be able to determine how quickly material is being hauled away from worksite 12 and how quickly replacement haul vehicles should be sent to worksite 12 to allow for a continuous milling operation.

For example, controller 32 may determine when to send additional haul vehicles to worksite 12 in order to accommodate the rate at which milled material is being hauled away from worksite 12. That is, as a quantity of material is hauled away or as each or a number of haul vehicles leaves worksite 12, controller 32 may send empty haul vehicles to replace the full haul vehicle(s) so the total number of haul vehicles at worksite 12 remains within a constant or desired range. In some circumstances, controller 32 may determine the travel time from plant 20 to cold planer 10 in order to ensure, for example, haul vehicle 19 can arrive at worksite 12 before the remaining time $T_F$ until haul vehicle 16 is full will expire. As cold planer 10 traverses surface 14 or moves to different locations at worksite 12, the distance between cold planer 10 and plant 20 may continually change. Thus, controller 32 may continually determine the distance and travel time to ensure the timely arrival of haul vehicles 16-19 and to minimize the amount of time that cold planer 10 must wait for an empty haul vehicle to arrive.

Based on the distance and travel time, controller 32 may then select a travel route between plant 20 and cold planer 10 that will allow a haul vehicle to arrive at cold planer 10 within the desired time limit. Based on the location information received from cold planer 10 and information received via locating device 28 and/or communication device 27, controller may select the travel route. Information received from locating device 28 and/or communication device may include known geographic and road information, as well as current traffic details (e.g., congested areas, closed roads, posted detours, restricted areas, etc.). Such information may also or alternatively be stored within the memory of controller 32 and accessed when determining the desired travel route. In this way, pauses in the milling operation caused by traffic delays may be avoided.

Controller 32 may receive a location signal from each of haul vehicles 16-19 and track their positions during the milling operation. Based on the location signals, controller 32 may determine how many haul vehicles are at worksite 12 and at plant 20 (and in transit) at any given time. Based on the data from cold planer 10 (e.g., one or more of the material transfer rate Δ, the remaining time $T_F$ until haul vehicle 16 is full, the distance and travel time between plant 20 and cold planer 10, and/or the heading of cold planer 10), controller 32 may determine a desired number of haul vehicles to he located at worksite 12 in order to allow for a continuous milling operation, and compare the desired number to the number of haul vehicles currently located at worksite 12. When the desired number is greater than the current number, controller 32 may increase the rate at which empty haul vehicles are dispatched to worksite 12. When the desired number is less than the current number, controller 32 may reduce the rate at which haul vehicles are dispatched to worksite 12 and, at times, may recall one or more haul vehicles to plant 20.

Based on the data received from cold planer 10 (e.g., the material transfer rate, the amount of material yet to be milled, and the cold planer location) and other information determined by controller 32 (e.g., travel distance and time between plant 20 and cold planer 10, the desire travel route, desired number of haul vehicles, the rate at which to dispatch more haul vehicle etc.), controller 32 may automatically generate first dispatch signals indicative of a request for one or more of haul vehicles 16-19 to travel to cold planer 10. In this way, operators of plant 20 may be allowed to focus on additional or other tasks while first dispatch signals are generated based on real-time data received from cold planer 10.

When one or more of haul vehicles 16-19 become full and is returning to plant 20, controller 32 may then generate second dispatch signals indicative of a location for haul vehicles 16-19 to deliver milled material received from cold planer 10. For example, controller 32 may generate the second dispatch signals based on the material ID associated with the milled material removed by cold planer 10. The material ID may be indicative of the type of material removed from surface 14, and may also correspond to a specified storage location at plant 20. In this way, operators and controller 32 of plant 20 may not have to wait for haul vehicles 16-19 to return to plant 20 before deciding where to store the milled material. Determining where to send the returning haul vehicle while it is still in transit may allow the haul vehicle to travel directly to that location instead of requiring the material to be inspected or otherwise checked. This may reduce time and effort spent by operators in determining the contents of each haul vehicle 16-19 and deciding where to store the material. Also, when plant 20 is no longer capable of storing additional material having a particular ID, the second dispatch signal may be sent while haul vehicles 16-19 are still in transit, allowing them to proceed to an alternate location, as desired.

Several advantages may be associated with the disclosed management system. For example, because controller 57 may generate data regarding operation of cold planer 10 and the milled material, this information may be communicated to plant 20 in real-time for use by operators and controller 32 in generating dispatch signals to haul vehicles 16-19. Because the data may include material transfer rate and location information, controller 32 may be able to generate dispatch signals to ensure the desired number of haul vehicles are present near cold planer 10 at worksite 12, and pauses in the milling operation may be avoided or minimized. Also, because controller 57 may determine and communicate the material ID to plant 20, dispatch signals may be generate to haul vehicles returning to plant 20 instructing them of an available location to receive the milled material, thereby reducing confusion and wasted travel time. Further, since controller 32 may automatically generate the dispatch signals, the operators of plant 20 may be able to efficiently focus on more or other tasks.

It will be apparent to those skilled in the art that various modifications and variations can be made to the disclosed management system without departing from the scope of the disclosure. Other embodiments of the management system will be apparent to those skilled in the art from consideration of the specification and practice of the management system disclosed herein. It is intended that the specification and examples be considered as exemplary only, with a true scope of the disclosure being indicated by the following claims and their equivalents.

What is claimed is:

1. A management system for a cold planer and a plurality of haul vehicles configured to transport milled material from the cold planer to a plant, the management system comprising:
   one or more sensors located onboard the cold planer and configured to generate data regarding at least one of cold planer operating parameters and milled material transferred from the cold planer to the plurality of haul vehicles;
   a locating device configured to generate a signal indicative of a cold planer location;
   a communication device configured to transfer information from the cold planer to the plant; and
   a controller in electronic communication with the one or more sensors and the locating device and configured to:
   determine a rate of material transfer from the cold planer to the plurality of haul vehicles based on the data;
   transmit the rate of material transfer and the cold planer location to the plant via the communication device;
   determine a material ID associated with the rate of material transfer based on the cold planer location; and
   transmit the material ID to the plant via the communication device.

2. The management system of claim 1, wherein the rate of material transfer is one or more of a volume per unit of time, a weight per unit of time, and a number of haul vehicles per unit time.

3. The management system of claim 1, wherein:
   the plant includes a display in electronic communication with the controller of the cold planer via the communication device; and
   the controller of the cold planer is configured to show one or more of the rate of material transfer, the material ID, an amount of material yet to be milled, and the cold planer location to an operator of the plant via the display.

4. The management system of claim 1, wherein the plant includes a controller in electronic communication with the controller of the cold planer via the communication device, the controller of the plant being configured to generate dispatch signals based on one or more of the data received from the cold planer and the cold planer location.

5. The management system of claim 4, wherein the controller of the plant is configured to generate a first dispatch signal indicative of a request for one or more of the plurality of haul vehicles to travel to the cold planer.

6. The management system of claim 5, wherein the controller of the plant is configured to determine the first dispatch signal based on one or more of the rate of material transfer, the amount of material yet to be milled, and the cold planer location.

7. The management system of claim 6, wherein the controller of the plant is configured to generate a second dispatch signal indicative of a location for one or more of the plurality of haul vehicles to deliver milled material received from the cold planer.

8. The management system of claim 7, wherein the controller of the plant is configured to generate the second dispatch signal based on the material ID.

9. A management system for a cold planer and a plurality of haul vehicles configured to transport milled material from the cold planer to a plant, the management system comprising:
   one or more sensors located onboard the cold planer and configured to generate data regarding at least one of cold planer operating parameters and milled material transferred from the cold planer to the plurality of haul vehicles;
   a locating device configured to generate a signal indicative of a cold planer location;
   a communication device configured to transfer information from the cold planer to the plant; and
   a controller in electronic communication with the one or more sensors and the locating device and configured to:
   determine a rate of material transfer from the cold planer to the plurality of haul vehicles based on the data;
   transmit the rate of material transfer and the cold planer location to the plant via the communication device; and a second controller of the plant in communication with the controller of the cold planer via the communication device, wherein the controller of the plant is configured to determine a first dispatch signal based on one or more of the rate of material transfer, a calculated amount of material yet to be milled, and the cold planer location.

10. The management system of claim 9, wherein first dispatch signal is indicative of a request for one or more of the plurality of haul vehicles to travel to the cold planer.

11. The management system of claim 9, wherein the second controller of the plant is configured to generate a second dispatch signal indicative of a location for one or more of the plurality of haul vehicles to deliver milled material received from the cold planer.

12. The management system of claim 11, wherein the second controller of the plant is configured to generate the second dispatch signal based the rate of material transfer and based on the cold planer location.

13. A management system for a cold planer and a plurality of haul vehicles configured to transport milled material from the cold planer to a plant, the management system comprising:
- one or more sensors located onboard the cold planer and configured to generate data regarding at least one of cold planer operating parameters and milled material transferred from the cold planer to the plurality of haul vehicles;
- a locating device configured to generate a signal indicative of a cold planer location;
- a communication device configured to transfer information from the cold planer to the plant; and
- a controller in electronic communication with the one or more sensors and the locating device and configured to:
- determine a rate of material transfer from the cold planer to the plurality of haul vehicles based on the data;
- transmit the rate of material transfer and the cold planer location to the plant via the communication device;
- a second controller of the plant in communication with the controller of the cold planer via the communication device, wherein the controller of the plant is configured to generate dispatch signals based on one or more of the data received from the cold planer, the cold planer location, and wherein the dispatch signals include a first dispatch signal indicative of a request for one or more of the plurality of haul vehicles to travel to the cold planer.

14. The management system of claim 13, wherein the controller of the plant is configured to determine the first dispatch signal based on one or more of the rate of material transfer, an amount of material yet to be milled, and the cold planer location.

15. The management system of claim 14, wherein the controller of the plant is configured to generate a second dispatch signal indicative of a location for one or more of the plurality of haul vehicles to deliver milled material received from the cold planer.

16. The management system of claim 15, wherein the controller of the plant is configured to generate the second dispatch signal based on the rate of material transfer and based on the cold planer location.

* * * * *